United States Patent [19]

Hausmann

[11] 4,152,049

[45] May 1, 1979

[54] SPATIAL FILTER HAVING AERODYNAMIC WINDOWS

[75] Inventor: George F. Hausmann, Glastonbury, Conn.

[73] Assignee: United Technologies Corporation, Hartford, Conn.

[21] Appl. No.: 862,708

[22] Filed: Dec. 21, 1977

[51] Int. Cl.² .......... G02B 5/20; G02B 5/00; H01S 3/02; H01S 3/04
[52] U.S. Cl. .......... 350/162 SF; 350/17; 350/319; 331/74.5 D; 331/74.5 P
[58] Field of Search .......... 350/319, 162 SF, 63, 350/17; 331/94.5 D, 94.5 G, 94.5 P, 94.5 T; 330/4.3

[56] References Cited

U.S. PATENT DOCUMENTS

| | | | |
|---|---|---|---|
| 3,617,928 | 11/1971 | Hausmann | 350/319 |
| 3,654,569 | 4/1972 | Hausmann | 350/319 |
| 3,704,053 | 11/1972 | Farmer | 350/162 SF |
| 3,907,409 | 9/1975 | Hausmann | 350/319 |
| 3,918,800 | 11/1975 | Griffin | 350/319 |
| 3,973,218 | 8/1976 | Kepler et al. | 350/319 |

Primary Examiner—Ronald J. Stern
Attorney, Agent, or Firm—Lawrence A. Cavanaugh

[57] ABSTRACT

An improved spatial filter for operation with high power laser beams is provided wherein a first gas flow system and a second gas flow system cooperate to enclose a cavity therebetween capable of accommodating a filter having an aperture located therein for spatially filtering the beam. The first and second gas flow systems are adapted for providing a first aerodynamic window across a beam entrance and a second aerodynamic window across a beam exit to maintain a selected gas pressure within the cavity while providing a transmission path for a high power laser beam. The first and second aerodynamic windows are in optical line of sight communication with one another through the aperture in the filter.

16 Claims, 4 Drawing Figures

U.S. Patent          May 1, 1979          4,152,049
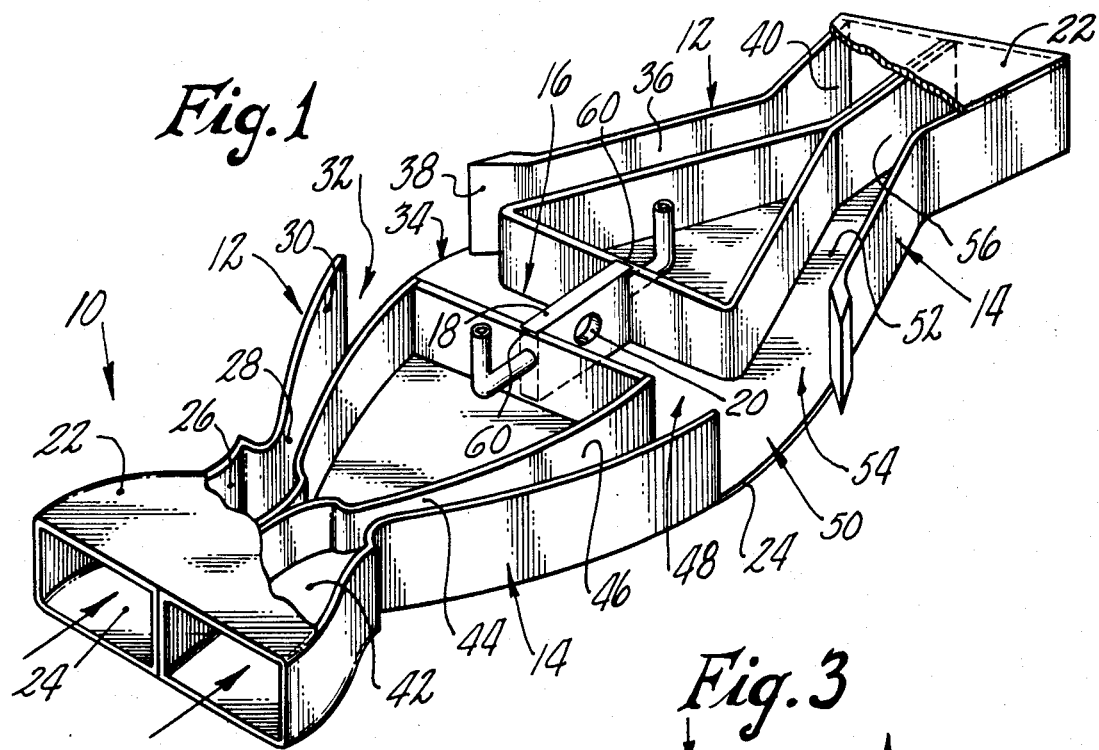
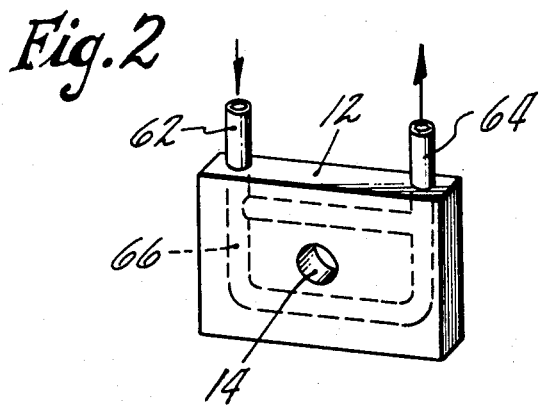
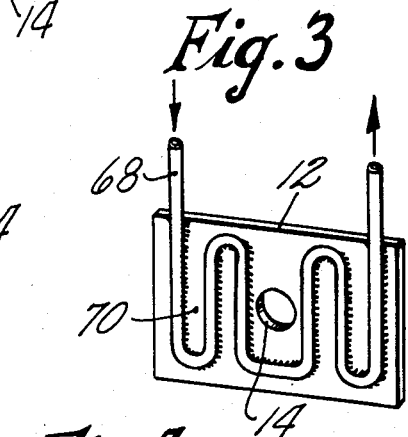
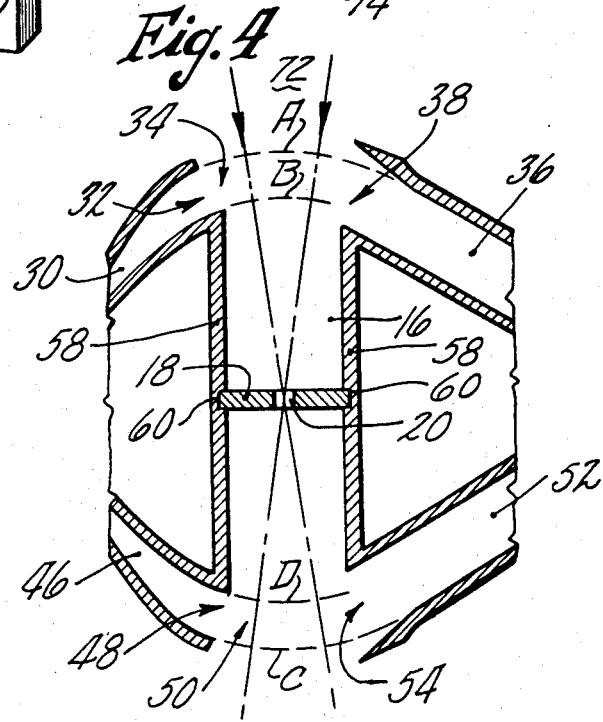

SPATIAL FILTER HAVING AERODYNAMIC WINDOWS

BACKGROUND OF THE INVENTION

This invention relates to spatial filters and more particularly to a spatial filter having an aerodynamic window for use with high power lasers.

Laser systems capable of providing an output beam having high optical quality effectively discriminate against nonuniformities within the beam such as high order transverse modes and high frequency phase distortions. One method well known in the art of discriminating against nonuniformities within a beam is to provide spatial filtering either of the radiation within the resonator of a laser or of the laser beam after it passes out of the resonator to filter out undesirable elements. For example, a spatial filter located at a common focal plane of a negative branch confocal optical system forming part of a resonator of a ring laser provides filtering of unwanted high order modes and high frequency phase distortions of radiation circulating within the resonator and results in an improved cross-sectional power density distribution in an output beam. The optical system typically includes a spherical mirror to focus radiation circulating within the resonator to a diffraction limited spot at the common focal plane typically at the spatial filter and a second spherical mirror to collect radiation expanding from the focal plane to provide a collimated beam of radiation to the active gain region of the resonator.

Spatial filtering is effective to discriminate against nonuniformities when the power density at the focal point is sufficiently low to avoid thermal blooming and/or breakdown of the gas or air in the transmission medium. Gas breakdown and/or thermal blooming results, however, when a high power laser beam is focused to a diffraction limited spot. An additional adverse effect is introduced when high power laser radiation is incident upon a metallic or conducting surface of a spatial filter. The interaction results in the formation of a plasma adjacent the filter which will attenuate or interfere with the beam transmission.

One method of avoiding the gas breakdown and/or thermal blooming problem is to spatial filter the beam in a vacuum or low pressure environment. This typically requires enclosing the filter in a housing having windows made of material transparent at the wavelength of the laser radiation. The radiation is focused through one window to a diffraction limited spot at the spatial filter. The radiation then expands from the spot through the filter and passes out of the environment through the second window. However, absorption of high power radiation within the windows can result in damage to windows and loss of power in the beam. Also, reflections at the window surfaces further increases the loss of power in the beam and may result in damage to other components of the laser system.

SUMMARY OF THE INVENTION

An object of the present invention is to provide an improved spatial filter for obtaining a laser beam having both high power and good optical quality.

According to the present invention an improved spatial filter adapted for operation with a high power beam of radiation comprises a housing having a first gas flow system with a beam entrance adapted for providing a first aerodynamic window, a second gas flow system with a beam exit adapted for providing a second aerodynamic window wherein the first gas flow system and the second gas flow system cooperate with the housing to form a cavity therebetween, and a filter having an aperture located therein positioned within the cavity wherein the beam entrance and the beam exit are in line of sight optical communication through the aperture in the filter.

A feature of the present invention is the cavity located between the first gas flow system and the second gas flow system capable of being maintained at a selected pressure by the first and second aerodynamic windows. Additionally, the first gas flow system has a first supersonic nozzle, located downstream a first entrance chamber, adapted for providing supersonic flow to a first duct. The first duct is adapted for expanding the supersonic flow across the beam entrance to provide a first aerodynamic window capable of maintaining a pressure difference between an atmosphere within the cavity and an atmosphere external to the present invention. Additionally, a first diffuser disposed downstream the beam entrance is adapted for collecting the gas flowing across the beam entrance and converting the dynamic pressure of the gas to static pressure. A first exhaust means located downstream the first diffuser is adapted for exhausting the gas flow from the first gas flow system. An embodiment of the present invention includes a first exhaust means adapted for circulating the gas to the first entrance chamber. The second gas flow system having elements similar to the first gas flow system is adapted for providing a second aerodynamic window across the beam exit. The beam entrance and exit are aligned with the cavity for passing a beam of radiation therethrough. Additionally, the filter within the cavity has an aperture sized to provide spatial filtering to the beam of radiation passing therethrough. Also, the filter is formed with material having a high threshold for damage by a beam of intense radiation. The filter also has cooling means for further increasing the threshold for damage.

An advantage of the present invention is the spatial filtering of a beam of radiation having high power without thermal blooming of the beam within the focal volume of the filter. Also, the ability to maintain a low pressure of gas within the cavity minimizes breakdown of the gas by the focused beam. In addition, the formation of a beam absorbing plasma in the vicinity of the aperture due to the interaction of a high powered laser beam with the filter is minimized by the choice of filter material, the shape and size of the aperture and by cooling the filter. A further advantage is that the cavity may be maintained with a gas having a high ionization potential to further minimize breakdown of the gas. Additionally, a pressure ratio of at least 150:1 may be maintained between the pressure of the atmosphere exterior to the present invention and the pressure of the atmosphere within the cavity.

These and other objects, features and advantages of the present invention will become more apparent in the light of the following detailed description of the preferred embodiment.

BRIEF DESCRIPTION OF THE DRAWING

FIG. 1 is a simplified perspective view of the present invention showing the major components;

FIG. 2 is a simplified view of a filter having coolant passages;

FIG. 3 is a view of an embodiment of the filter; and

FIG. 4 is a simplified schematic of a first and second aerodynamic window cooperating in accordance with the present invention.

DESCRIPTION OF THE PREFERRED EMBODIMENT

FIG. 1 shows a simplified perspective view of the present invention of an improved spatial filter adapted for use with high power radiation. A housing 10 includes a first gas flow system 12, a second gas flow system 14, a cavity 16 located between the first and second gas flow systems, a filter 18 having an aperture 20 located within the cavity, a top 22 and a base 24. The first gas flow system 12 has a first entrance chamber 26 adapted for receiving a flow of gas from a source (not shown) such as a pump, a first supersonic nozzle 28, such as a Laval nozzle, attached to the downstream side of the first entrance chamber, a first duct 30 attached at one end to the downstream side of the supersonic nozzle and having an exit 32 on the other end defining the upstream side of a beam entrance 34. A first diffuser 36 is positioned downstream the beam entrance and has an entrance 38 defining the downstream side of the beam entrance 34 for collecting gas flowing thereacross. A first exhaust duct 40 is positioned downstream the first diffuser. The second gas flow system 14 has a second entrance chamber 42 adapted for receiving a flow of gas from a second gas source (not shown), a second supersonic nozzle 44, such as a Laval nozzle, attached to the downstream side of the second entrance chamber, a second duct 46 attached at one end to the downstream side of the second supersonic nozzle and having an exit 48 at the other end defining the upstream side of a beam exit 50. A second diffuser 52 is positioned downstream the beam exit and has an entrance 54 defining the downstream side of the beam exit 50 for collecting gas flowing thereacross. A second exhaust duct 56 is positioned downstream the second diffuser. In one embodiment the first and second exhaust ducts 40, 56 permit the gas flow to be exhausted to the atmosphere as an open loop system. In a further embodiment the exhaust ducts may be connected to a recycling system for circulating the gas to the entrance chambers as disclosed by Hausmann in U.S. Pat. No. 3,654,569 filed Dec. 23, 1968, held with the present application by a common assignee, and incorporated by reference into the patent application.

The entrance chambers 26, 42 are adapted for receiving a flow of gas from pumping means (not shown), or for a source of gas, and for directing the gas to the supersonic nozzles. In the preferred embodiment a separate source of gas is provided to each gas flow system. However, the apparatus will operate with a single source of gas or pumping means for supplying a flow of gas or both gas flow systems 12, 14. In a like manner, the exhaust ducts 40, 56, in the preferred embodiment, comprise individual ducts. However, a single exhaust duct common to the first and second diffusers may also be utilized.

The filter 18 located within the cavity 16 formed between the first and second gas flow systems 12, 14 is removably attached to side walls 58. In the preferred embodiment, the ends of the filter are inserted into grooves 60 within the side walls, sized to accommodate the thickness of the filter, to enable replacement of the filter due to damage or to change the filter to obtain an aperture having a different size of shape.

FIG. 2 shows a simplified perspective drawing of the filter 12 having a coolant inlet pipe 62, a coolant exit pipe 64 and coolant passage 66 within the filter. This configuration is satisfactory where the filter has sufficient thickness to accommodate coolant passages. FIG. 3 shows an alternate embodiment wherein a coolant tube 68 is attached to a face 70 of the filter by welding or other suitable methods well known in the art. This configuration is preferred for use with filters having a thickness insufficient to support internal coolant passages.

Referring now to FIG. 4 which shows a sectional view of the beam entrace and exit 34, 50 respectively, cooperating with the aperture 20 in the filter 18 to provide an optical path for passing a laser beam 72 through the improved spatial filter. In operation, the Mach number of the flow within the first and second ducts 30, 46 is supersonic and the pressure and temperature of the gas within the entrance chambers 26, 42, the area ratio of the supersonic nozzles 28, 44 and the configuration of the first and second ducts 30, 46 are selected by methods well known in the art to obtain a low pressure, typically less than ten torr within the cavity. The operational characteristics of aerodynamic windows is described by Kepler et al in U.S. Pat. No. 3,973,218 filed Mar. 21, 1975, held with the present application by a common assignee and is incorporated by reference into the present application.

It is thus apparent that in accordance with the operational principals of aerodynamic windows there is no gas flow between the environment exterior to the improved spatial filter and the environment within the cavity 16 and an aerodynamic window capable of transmitting radiation therethrough is formed by the supersonic flow across the beam entrance 34 and the beam exit 50. It is to be recognized that many methods are known in the art for establishing an oblique shock wave or series of shock to cause an increase in the static pressure of the flow and to turn the direction of the flow to form an aerodynamic window. In the operation of the present invention care must be exercised to maintain the static pressure in first and second ducts 30, 46 exactly equal to avoid a pressure differential within the cavity resulting in gas flow from one gas flow system to the other gas flow system.

In operation, the supersonic flow across the beam entrance results in a first aerodynamic window and the supersonic flow across the beam exit results in a second aerodynamic window. The shape of the aerodynamic windows produces an aspiratoring effect on the pressure level within the cavity causing the pressure within the cavity to be reduced. Pressure ratio variable between 1:1 and at least 150:1 may be maintained between the atmosphere external to the improved spatial filter and atmosphere within the cavity. This results in a significant reduction of the static pressure and gas density within the focal volume and significantly reduces thermal blooming of the beam caused by heating of the gas molecules. Additionally, the low gas pressure in the focal volume significantly increases the breakdown threshold of the gas. In addition, gases having a high ionization potential such as helium may be utilized in the present invention to further increase the breakdown threshold of the gas.

It is to be recognized that the use of multiple aerodynamic windows, as disclosed by Hausmann in U.S. Pat. No. 3,617,928 filed May 23, 1968 and U.S. Pat. No. 3,907,409 filed Jan. 28, 1974 and both held with the present application by a common assignee, on both sides of the filter will result in ability to obtain very high pressure ratio between the pressure external to the improved spatial filter and the pressure within the cavity.

The pressure on both sides of streamlines A and B as shown in FIG. 4 is equalized as is the pressure on both sides of streamlines B and D such that there is no gas flow from the atmosphere external to the aerodynamic windows into the cavity. Since gas leakage does not occur across streamlines A and B or C and D, the gas flowing across the aerodynamic windows may be selected independently of the environment external to present invention. Thus the present invention may be utilized within an optical cavity of a laser without contamination of the gain medium within the laser provided the exhaust ducts 40, 56 do not allow the gas to be passed into the optical cavity.

Cooling the filter with coolant flowing through the coolant tubes as shown in FIGS. 2 and 3 increases the heat transfer capabilities of the filter and allows operation of the filter with laser beams having high power densities. The cooled filter increases the threshold for damage to the filter by the intense beam and increases the threshold for the formation of a beam absorbing plasma adjacent the filter by the interaction of the beam of radiation with the material of the filter. Thus it is readily apparent that the aerodynamic windows provide a passage transparent at the wavelength of laser radiation to minimize absorption and reflection losses while maintaining a pressure ratio of the atmosphere within the cavity and the atmosphere external to the cavity to provide an atmosphere within the cavity capable of minimizing thermal blooming and gas breakdown.

Although the invention has been shown and described with respect to a preferred embodiment thereof, it should be understood by those skilled in the art that the foregoing and various other changes and omissions in the form and detail thereof may be made therein without departing from the spirit and scope of the invention.

Having thus described a typical embodiment of my invention that which I claim as new and desire to secure by Letters Patent of the United States is:

1. An apparatus for use with a beam of radiation having high power to provide spatial filtering of the beam comprising:
   a housing;
   a first gas flow system located within the housing, having a beam entrance adapted for providing a first aerodynamic window transmissive to a beam of radiation;
   a second gas flow system, located within the housing, having a beam exit adapted for providing a second aerodynamic window transmissive to a beam of radiation wherein the first gas flow system and the second gas flow system cooperate with the housing to form a cavity therebetween; and
   a filter having an aperture located therein positioned within the cavity wherein the beam entrance and the beam exit are in line of sight optical communication with one another through the aperture in the filter.

2. The invention in accordance with claim 1 further including means for cooling the filter.

3. The invention in accordance with claim 2 wherein the means for cooling the filter includes:
   a coolant passage within the filter;
   a coolant inlet tube attached to one end of the coolant passage; and
   a coolant exit tube attached to the other end of the passage.

4. The invention in accordance with claim 2 wherein the means for cooling the filter is a coolant tube fixedly attached to one surface of the filter.

5. The invention in accordance with claim 1 wherein the first gas flow system comprises:
   a first entrance chamber;
   a first supersonic nozzle positioned downstream the first entrance chamber adapted for providing supersonic gas flow to a first duct;
   a first duct attached at one end to the first supersonic nozzle and having an exit defining the upstream side of the beam entrance, said first duct adapted for providing supersonic flow across the beam entrance to form the first aerodynamic window;
   a first diffuser disposed downstream the first duct and having an entrance defining the downstream side of the beam entrance adapted for collecting gas flowing across the beam entrance, said first diffuser capable of converting the dynamic pressure of the gas therein to static pressure; and
   a first exhaust duct disposed downstream the first diffuser.

6. The invention in accordance with claim 5 wherein the second gas flow system comprises:
   a second entrance chamber;
   a second supersonic nozzle positioned downstream the first entrance chamber adapted for providing supersonic gas flow to a second duct;
   a second duct attached at one end to the second supersonic nozzle and having an exit defining the upstream side of the beam exit, said second duct adapted for providing supersonic flow across the beam exit to form the second aerodynamic window;
   a second diffuser disposed downstream the second duct and having an entrance defining the downstream side of the beam exit adapted for collecting gas flowing across the beam exit, said second diffuser capable of converting the dynamic pressure of the gas therein to static pressure; and
   a second exhaust duct disposed downstream the second diffuser.

7. The invention in accordance with claim 6 further including;
   a first return duct attached at one end to the first exhaust duct and at the other end to the first entrance chamber;
   first pumping means within the first return duct for circulating the gas;
   first heat exchanger means within the first return duct adapted for dissipating adiabatic temperature rise within the first pumping means;
   a second return duct attached at one end to the second exhaust duct and at the other end to the second entrance chamber;
   second pumping means within the second return duct for circulating the gas; and
   second heat exchanger means within the second return duct adapted for dissipating adiabatic temperature rise within the first pumping means.

8. The invention in accordance with claim 7 wherein the first and second supersonic nozzles are Laval nozzles.

9. The invention in accordance with claim 6 further including:

a return duct attached at one end to the first and second exhaust ducts and at the other end to the first and second entrance chamber;

pumping means within the return duct for circulating the gas; and heat exchanger means within the return duct adapted for dissipating adiabatic temperature rise within the pumping means.

10. The invention in accordance with claim 9 further including a gas source for providing a flow of gas to the first and second gas flow systems.

11. The invention in accordance with claim 1 further including walls within the cavity having grooves adapted for receiving the ends of the filter to removably position the filter within the cavity.

12. A method for providing spatial filtering to a beam of radiation having high power comprising the steps of:

providing a flow of gas to a first gas flow system capable of forming a first aerodynamic window between a first region at a first pressure and a second region at a second pressure;

providing a flow of gas to a second gas flow system capable of forming a second aerodynamic window between the first region and the second region wherein the first gas flow system and the second gas flow system cooperate to define the first region therebetween;

expanding the flow of gas through supersonic nozzles in the first and second gas flow systems to supersonic flow within a first and second duct;

controlling the direction of supersonic flow across a beam entrance to obtain an aerodynamic window across the beam entrance;

controlling the direction of supersonic flow across a beam exit to obtain an aerodynamic window across the beam exit wherein the supersonic flow across the first and second aerodynamic windows provide aspiration of the gas within the first region to reduce the static pressure therein;

controlling the total pressure of the gas provided to the first and second gas flow systems to control the static pressure within the first region;

providing a filter, having an aperture, within the first region wherein the first and second aerodynamic windows are in line of sight optical communication through the aperture; and focusing a beam of radiation from the second region through the first aerodynamic window into a focal volume within the aperture in the filter positioned within the first region to provide spatial filtering of the beam and passing the beam expanding from the focal volume through the second aerodynamic window into the second region.

13. The method according to claim 12 wherein the gas provided to the first and second gas flow systems has a high ionization potential.

14. The method in accordance with claim 13 wherein the gas is helium.

15. The method according to claim 12 wherein the total pressure of the gas provided to the first and second gas flow systems is controlled to provide a ratio of the pressure within the second region to the pressure within the first region variable between 1:1 and at least 150:1 to minimize thermal blooming and/or breakdown of the gas by the high intensity of the focused beam within the focal volume.

16. The invention in accordance with claim 12 wherein the pressure within the first region is maintained at a pressure of less than ten torr to minimize thermal blooming and/or breakdown of the gas by the high intensity of the focused beam within the focal volume.

* * * * *